United States Patent Office 2,988,438
Patented June 13, 1961

2,988,438
COMBUSTIBLE COMPOSITIONS
Joseph M. Allovio, Wood River, Ill., assignor to Olin Mathieson Chemical Corporation, East Alton, Ill., a corporation of Virginia
No Drawing. Filed Apr. 4, 1957, Ser. No. 650,575
2 Claims. (Cl. 52—24)

This invention relates to explosives and more particularly to incendiary or combustible mixtures and compositions.

The terms "incendiary" and "combustible" are used in the broad sense and encompass solid mixtures of oxidizers and fuels and of other reactive materials suitable for use in various military and commercial applications; e.g. tracer mixes, incendiary compositions, pyrotechnic mixtures, fuzee mixes, flare compositions, delay elements, and the like.

Incendiary mixes are normally prepared by the admixture of the particulate components of the composition. Such mixtures are most frequently composed of a metal in granular or flake form together with one or more oxidizers or other sensitizers. Such mixtures can also be composed of components that react without oxidation such as lead with selenium or tin. Due to the difference in size and density of the materials making up such mixtures, they are highly susceptible to segregation and it is exceedingly difficult to maintain a uniform composition throughout the mixture. In addition, the majority of such mixtures are sensitive to friction and impact and susceptible to premature reaction or gradual modification of their surface and burning characteristics. Thus, extreme caution is required in their formulation, subsequent handling and loading. Efforts have been made to circumvent some of these difficulties by providing one or more of the active ingredients of such mixtures with protective coatings. While this practice has met with a modicum of success, the mixtures thus treated are still subject to segregation in subsequent handling and extreme measures must be taken to insure their uniformity.

It is, therefore, an object of this invention to provide incendiary and combustible compositions and mixtures that overcome the disadvantages of the prior art. It is another object of this invention to provide incendiary compositions and mixtures not susceptible to segregation. Another object of this invention is to provide a permanently homogeneous incendiary mixture that can be handled and loaded safely. A further object of this invention is to provide a novel process for the preparation of incendiary and combustible mixtures and compositions. It is also an object of this invention to provide novel incendiary and combustible mixtures and compositions.

In accordance with this invention, generally stated, these and other objects are accomplished by providing a permanently homogeneous mixture of the incendiary or combustible components bound together in a plastic matrix in the form of spheres or spheroids. Each spherical particle of the plastic matrix has the same composition as the original mixture and thus all possibility of segregation in the mixture or of one component thereof being concentrated in one or more areas of the mixture is completely obviated. In addition to providing a permanently homogeneous mixture, the spherical pellets of the matrix also insure that the composition will be free flowing so as to facilitate subsequent handling and loading.

This invention contemplates the preparation of such spherical pellets containing the components of the incendiary or combustible mixture by agitating a soluble resinous thermoplastic material together with a solvent for the plastic material and the components of the incendiary composition in an excess of an immiscible liquid medium that is not a solvent for the plastic material. The plastic material is dissolved by the solvent so as to form a lacquer suspended in the non-solvent medium. Due to the agitation of the system, the lacquer is distributed throughout the non-solvent medium in the form of droplets or spheres containing the constituents of the incendiary composition. Agitation is continued throughout the process and when the suspended lacquer particles have assumed a spherical or near-spherical shape, the solvent is removed from the lacquer particles by distillation, air-stripping, or the like. In order to avoid coagulation or coalescence of the suspended lacquer particles, a protective colloid is present in the non-solvent medium prior to the addition of the lacquer-forming materials. It is believed that the protective colloid increases the viscosity of the lacquer-non-solvent medium interface so as to prevent collision and agglomeration of the suspended lacquer particles. Suitable protective colloids include gum arabic, starch, bentonite, dextrin, animal glue, and the like. In most instances, it has been found that about 2% of the protective colloid distributed throughout the non-solvent medium will prove effective. Generally, water is the most convenient and most practical non-solvent medium but in cases where the compositions contain water soluble ingredients, other non-solvent mediums may be employed.

Numerous plastic materials can be used to provide the plastic matrix for the reactive components. Any soluble synthetic thermoplastic material can be used. Examples of suitable materials together with solvents that have been found particularly useful when water is used as the non-solvent medium include ethyl cellulose with toluene, ethyl cellulose with toluene and methyl ethyl ketone, ethyl cellulose with isopropyl acetate, cellulose acetate with toluene, cellulose acetate with isopropyl acetate, cellulose acetate butyrate with toluene, cellulose acetate butyrate with toluene and methyl ethyl ketone, cellulose acetate butyrate with isopropyl acetate, coumarone-indene with cyclohexane, polystyrene with benzene and polystyrene with cyclohexane.

In order to provide an operable system, the solvent used for the plastic matrix must be immiscible with the non-solvent medium such as water. While it is appreciated that most liquids are at least partially miscible with one another, the term "immiscible" as applied herein relates to liquids that form two phases when they are mixed together, regardless of the fact that a portion of the two liquids in the mixture is capable of forming a homogeneous mixture.

Any of the well known incendiary and combustible mixtures can be prepared in accordance with this invention. Suitable mixtures of granular or particulate combustible constituents include aluminum and barium chromate, magnesium and barium permanganate, boron and cesium perchlorate, iron and magnesium peroxide, cerium and manganese dioxide, zirconium and molybdenum dioxide, aluminum-magnesium alloy and potassium perchlorate, zirconium-nickel alloy and lead chromate, zirconium-lead alloy and ammonium nitrate, iron-cerium alloy and barium chlorate, barium nitrate, potassium chlorate and/or lead nitrate, lead and selenium, and selenium and sulfur or tellurium with barium peroxide, lead oxide (PbO) and/or red lead.

In order that the invention may be further clarified, following is an example illustrating a typical embodiment thereof. Unless otherwise indicated, all portions of the materials used are given in parts by weight. A mixture of 40 parts of aluminum-magnesium alloy, 25 parts of magnesium peroxide and 25 parts cellulose acetate butyrate was placed in a graining kettle containing about 1,000 parts of water at a temperature of about 20° C. About 20 parts of gum arabic were dissolved in the water prior to the addition of the other components to serve as a protective colloid. The vessel was equipped with suitable agitation means and the agitation was continued throughout the process. After the cellulose acetate butyrate, the alloy and the oxidizer were dispersed in the water, about 300 parts isopropyl acetate were added to the aqueous medium. With continued agitation, the system was heated to a temperature between about 60° C.–70° C. so as to facilitate solution of the cellulose acetate butyrate in the isopropyl acetate. After about 40 minutes, the resultant lacquer was broken into droplets by the agitation. These irregular droplets were then converted to sphere-like masses by continued agitation and the action of the surface tension. At this point, the system was gradually heated to a temperature of 98° C.–99° C. so as to drive off the isopropyl acetate contained in the lacquer. The suspended lacquer particles were thus solidified in the form of spheres or spheroids each containing a portion of the aluminum-magnesium alloy and magnesium peroxide in about the same ratio as they were originally introduced into the system, i.e. about 1 part of magnesium oxide for each 1.6 parts of the alloy. The agitation of the system was then stopped and the spherical grains permitted to settle to the bottom of the graining vessel. The spherical pellets or grains were then separated from the aqueous medium by decantation and washed to remove any gum arabic adhering to their surfaces. These grains, having an average particle size between 0.034 inch and 0.025 inch were then dried by suitable means.

The incendiary mixture thus prepared was in the form of free flowing spherical pellets in which the ingredients were protected from surface oxidation or premature reaction and in which any possibility of segregation was completely obviated. The incendiary mixture prepared in accordance with this embodiment is particularly useful as a charge for incendiary bullets.

In those cases where a water soluble oxidizer or component is included in the combustible mixture and water is used as the non-solvent medium, a modification of the process is required to prevent solution of the water soluble material in the aqueous medium. When such water soluble components are employed, the lacquer from the plastic matrix and its solvent is prepared in a separate vessel and the water soluble ingredients such as ammonium nitrate, and the like preferably with the metal or other fuel are incorporated into the lacquer prior to its addition to the non-solvent suspending medium. In this way, the water soluble materials are provided with a protective coating and after the lacquer particles are added to the agitated non-solvent medium the lacquer is dispersed and broken up into spherical particles as described above. In like manner, the solvent is removed from these suspended lacquer particles and the resultant solidified spheres or spheroids containing a homogeneous mixture of the incendiary constituents are obtained.

Each of the particles obtained by this process is a homogeneous burning unit which, due to its spherical shape, facilitates handling and packing with automatic machinery. Also, any desired changes in composition, energy level, burning rates and flame temperatures can be readily controlled by alterations of the components making up these units.

While a detailed description of the invention has been provided, it is realized that those skilled in the art may make modifications in and adaptations of the process described without departure from the spirit and scope of this invention.

What is claimed is:

1. A method of preparing free flowing permanently homogeneous incendiary mixtures of granular materials uniformly dispersed in a polymeric matrix in the form of a plurality of substantially spherical pellets which comprises dissolving an organic polymeric material selected from the group consisting of ethyl cellulose, cellulose acetate, cellulose acetate butyrate, coumarone-indene copolymers, and polystyrene in a water immiscible solvent therefor to form a lacquer, uniformly distributing discrete particles of a granular pyrotechnic mixture selected from the group consisting of aluminum and barium chromate, magnesium and barium permanganate, boron and cesium perchlorate, iron and magnesium dioxide, cerium and manganese dioxide, zirconium and molybdenum dioxide, and aluminum-magnesium alloy and potassium perchlorate, a zirconium-nickel alloy and lead chromate, a zirconium-lead alloy and ammonium nitrate, an iron-cerium alloy and barium chlorate, an iron-cerium alloy and barium nitrate, an iron-cerium alloy and potassium chlorate, an iron-cerium alloy and lead nitrate, lead and selenium, selenium sulfur and barium peroxide, selenium sulfur and lead dioxide, selenium, sulfur and red lead, selenium, tellurium and barium peroxide, selenium, tellurium and lead dioxide, and selenium, tellurium and red lead, agitating the lacquer in an excess of water having a protective colloid dispersed therein until the lacquer is divided into a multiplicity of spherical globules, maintaining the agitation while distilling the solvent from the lacquer globules so as to solidify them, and separating the solidified lacquer globules from the water.

2. The method of claim 1 in which the organic polymeric material is cellulose acetate butyrate, the fuel is an aluminum-magnesium alloy and the oxidizer is magnesium peroxide.

References Cited in the file of this patent

UNITED STATES PATENTS

| | | |
|---|---|---|
| 2,073,530 | Sherman | Mar. 9, 1937 |
| 2,375,175 | Silk | May 1, 1945 |
| 2,384,730 | Davis | Sept. 11, 1945 |
| 2,406,572 | Vogl | Aug. 27, 1946 |
| 2,760,434 | Ruth | Aug. 28, 1956 |
| 2,889,216 | Mulqueeny et al. | June 2, 1959 |